United States Patent
Topalov et al.

(10) Patent No.: US 9,405,722 B2
(45) Date of Patent: *Aug. 2, 2016

(54) METHOD AND APPARATUS FOR FORM FILLING

(75) Inventors: Ognian Z. Topalov, Santa Clara, CA (US); Eric Hohenstein, Los Gatos, CA (US)

(73) Assignee: FACEBOOK, INC., Menlo Park, CA (US)

( * ) Notice: Subject to any disclaimer, the term of this patent is extended or adjusted under 35 U.S.C. 154(b) by 707 days.

This patent is subject to a terminal disclaimer.

(21) Appl. No.: 13/618,531

(22) Filed: Sep. 14, 2012

(65) Prior Publication Data

US 2013/0173739 A1 Jul. 4, 2013

Related U.S. Application Data

(60) Continuation of application No. 12/511,852, filed on Jul. 29, 2009, now Pat. No. 8,407,581, which is a division of application No. 10/631,955, filed on Jul. 30, 2003, now Pat. No. 7,779,345.

(51) Int. Cl.
G06F 17/00 (2006.01)
G06F 15/167 (2006.01)
G06F 17/24 (2006.01)

(52) U.S. Cl.
CPC ............ *G06F 15/167* (2013.01); *G06F 17/243* (2013.01)

(58) Field of Classification Search
CPC .................................................... G06F 17/243
USPC ......................................... 715/221, 224, 225
See application file for complete search history.

(56) References Cited

U.S. PATENT DOCUMENTS

| 5,404,505 | A | 4/1995 | Levinson | |
|---|---|---|---|---|
| 6,151,581 | A | 11/2000 | Krafston et al. | |
| 6,199,079 | B1 * | 3/2001 | Gupta et al. | 715/207 |
| 6,327,574 | B1 | 12/2001 | Kramer et al. | |
| 6,345,278 | B1 * | 2/2002 | Hitchcock et al. | |
| 6,400,996 | B1 | 6/2002 | Haffberg et al. | |
| 6,490,601 | B1 * | 12/2002 | Markus et al. | 715/207 |
| 6,519,571 | B1 | 2/2003 | Guheen et al. | |
| 6,535,880 | B1 | 3/2003 | Musgrove et al. | |
| 6,536,037 | B1 | 3/2003 | Guheen et al. | |

(Continued)

FOREIGN PATENT DOCUMENTS

| EP | 1126392 | 8/2001 |
|---|---|---|
| EP | 1168264 | 1/2002 |

(Continued)

OTHER PUBLICATIONS

U.S. Appl. No. 13/593,249, filed Jan. 21, 2014, Notice of Allowance.

(Continued)

*Primary Examiner* — Stephen Hong
*Assistant Examiner* — Matthew Ludwig
(74) *Attorney, Agent, or Firm* — Keller Jolley Preece

(57) ABSTRACT

In the presently preferred embodiment of the invention, every time a user submits a form the client software tries to match the submitted information with the stored profile of that user. If a match is discovered, the program tags the field of the recognized data with a corresponding type. The resulting profile can be used after that to help all subsequent users to fill the same form.

20 Claims, 3 Drawing Sheets

(56) References Cited

U.S. PATENT DOCUMENTS

| | | |
|---|---|---|
| 6,651,217 B1 | 11/2003 | Kennedy et al. |
| 6,910,179 B1 * | 6/2005 | Pennell et al. ............... 715/207 |
| 7,003,670 B2 | 2/2006 | Heaven et al. |
| 7,146,505 B1 | 12/2006 | Harada et al. |
| 7,334,184 B1 | 2/2008 | Simmons |
| 7,350,139 B1 | 3/2008 | Simmons |
| 7,461,251 B2 | 12/2008 | Oishi |
| 7,779,345 B2 | 8/2010 | Topalov et al. |
| 7,966,287 B2 | 6/2011 | Brown |
| 8,407,581 B2 | 3/2013 | Topalov et al. |
| 2002/0023108 A1 | 2/2002 | Daswani et al. |
| 2002/0120465 A1 | 8/2002 | Mori et al. |
| 2002/0174013 A1 | 11/2002 | Freeman et al. |
| 2003/0115549 A1 | 6/2003 | Ward |
| 2004/0068693 A1 | 4/2004 | Rawat et al. |
| 2005/0235018 A1 | 10/2005 | Tsinman et al. |
| 2006/0200754 A1 | 9/2006 | Kablesh et al. |
| 2008/0141261 A1 | 6/2008 | Machido |
| 2008/0262878 A1 | 10/2008 | Webby et al. |
| 2009/0287773 A1 | 11/2009 | Topalov et al. |
| 2009/0287923 A1 | 11/2009 | Topalov et al. |

FOREIGN PATENT DOCUMENTS

| | | |
|---|---|---|
| EP | 1248207 | 10/2002 |
| EP | 1262748 | 12/2002 |
| EP | 1265170 | 12/2002 |
| EP | 1284461 | 2/2003 |

OTHER PUBLICATIONS

U.S. Appl. No. 12/511,864, filed Jul. 29, 2009, Topalov et al.
U.S. Appl. No. 13/593,249, filed Aug. 23, 2012, Topalov et al.
Pagnoni, et al.; "Paperwork Reduction by Means of Data Mining"; Jul. 2000; Data Mining II. Second International Conf. on Data Mining.
Maglio, et al.; "LiveInfo: Adapting web experience by customization and annotation"; Aug. 2000, *In Proceedings of the First International Conference on Adaptive Hypermedia and Adaptive Web-based Systems* (AH 2000), Trento, Italy. Springer-Verlag.
U.S. Appl. No. 12/511,852, filed Jul. 6, 2012, Office Action.
U.S. Appl. No. 12/511,852, filed Oct. 15, 2012, Notice of Allowance.
U.S. Appl. No. 12/511,864, filed Aug. 9, 2010, Office Action.
U.S. Appl. No. 12/511,864, filed Jun. 21, 2011, Office Action.
U.S. Appl. No. 12/511,864, filed Sep. 21, 2012, Notice of Allowance.
U.S. Appl. No. 12/511,864, filed Jan. 7, 2011, Office Action.
U.S. Appl. No. 12/511,864, filed Jan. 17, 2012, Office Action.
U.S. Appl. No. 12/511,864, filed Jun. 17, 2012, Notice of Allowance.
International Search Report dated Sep. 4, 2009 as received in PCT/US04/22912.
U.S. Appl. No. 10/631,955, filed Oct. 19, 2009, Office Action.
U.S. Appl. No. 10/631,955, filed Apr. 8, 2010, Notice of Allowance.
U.S. Appl. No. 12/511,852, filed Dec. 10, 2012, Notice of Allowance.
U.S. Appl. No. 12/511,864, filed Dec. 10, 2012, Notice of Allowance.
U.S. Appl. No. 13/593,249, filed Aug. 6, 2013, Office Action.

* cited by examiner

METHOD AND APPARATUS FOR FORM FILLING

CROSS-REFERENCE TO RELATED APPLICATIONS

The present application is a continuation of U.S. application Ser. No. 12/511,852 filed Jul. 29, 2009, which is a division of U.S. application Ser. No. 10/631,955, filed Jul. 30, 2003, which is now issued as U.S. Pat. No. 7,779,345. Each of the aforementioned patent(s), application(s) are hereby incorporated by reference in their entirety.

BACKGROUND OF THE INVENTION

1. Technical Field

The invention relates to completing a Web-based form with information from a user's profile. More particularly, the invention relates to a reverse mapping method and apparatus for form filling.

2. Description of the Prior Art

Form-fill is a technology that is aimed to automate the task of Web form completion with a user's specific profile information. Almost all Web sites today collect some information from their users. This information could be addresses, names, emails, or even credit card information in case of on-line shopping. For a particular user in most of the cases this involves the user entering the same address or credit card information over and over again. This tedious and error prone process for even Internet savvy users could become prohibitively difficult for novices.

Enter the form-filling technology. It is usually implemented on the user's client, e.g. browser, as a piece of software that knows the user's profile data, such as his first name, last name, street address, phone, etc. It also has a mapping between the user's information and the corresponding fields of the Web form to be filled. The form-filling code then takes information from the user's profile and automatically completes the form with the requested information. The user after that could review, i.e. proof read, the form and simply submit it.

The users' profile data is provided by the user upon the initial setup process or sometimes it can be collected on demand, based on the requirements of the current Web form. The most sophisticated part of the process is in creation of the mapping between the form fields and their meaning. This mapping process is presently known to comprise either of a hard-coded mapping and an intelligent mapping. Hard coded mapping is achieved by manually creating links between the field names and their meanings. Intelligent mapping uses a rule-based approach to search for keywords that would help the software to translate the labels and the text around the field.

Hard-Coded Mapping (Site Profiling)

A major issue with this approach is the cost to collect and maintain profile information for an enormously large set of domains. The cost to support even the top 1000 domains could become prohibitively high. It is thought that this approach is impractical to maintain a list of more than 300 supported domains.

Intelligent Form Fill (IFF)

The problem with IFF is that this can be characterized as natural language understanding, and in some cases even image analysis, both of which are known to present extremely difficult technical issues. Efforts over the last several decades in trying to recreate these simple human abilities with software tools have not been particularly successful. Although, the problem to be solved is limited to recognizing of 10-15 profile attributes correctly, the number of different ways in which Web sites can ask for the same information is still very high. Algorithms known today rely upon dictionaries of keywords and patterns to identify the form fields. Yet, the accuracy of such algorithms is just a little above 85%. Every additional percent in accuracy improvement requires significant trial-and-error, fine-tuning, and regression testing. Additionally, localizing these dictionaries and word patterns in other languages would require the same time-consuming trial-and-error technique. This approach is thus considered to be practically inefficient in achieving and maintaining levels higher than 86-87% accuracy. It is also hard and expensive to extend the service to international languages.

It would be advantageous to provide low-cost, high quality form filling, with coverage of a large number of Web sites, and thereby overcome the limitations of the existing site profiling and IFF solutions.

SUMMARY OF THE INVENTION

The invention provides a method and apparatus for low-cost, high quality form filling, with coverage of a large number of Web sites, and thereby overcomes the limitations of the existing site profiling and IFF solutions. In the presently preferred embodiment, every time a user submits a form the client software tries to match the submitted information with the stored profile of that user. If a match is discovered, the program tags the field of the recognized data with a corresponding type of the data submitted by the user. The resulting profile can be used after that to help all subsequent users to fill the same form.

DETAILED DESCRIPTION OF THE INVENTION

For purposes of the discussion herein, the terms in Table 1 below shall have their associated meanings:

TABLE 1

Glossary of Terms

| | |
|---|---|
| Form (Site) mapping | Manual process of building relations between the fields in a given form and their corresponding types (meanings). |
| Form fill | Technology that automates the process of Web form completion with user specific information, such as addresses, credit cards, etc. |
| Intelligent Form Fill (InteliFill) | Form fill, which uses an heuristic, rule-based approach relying on key words, patterns, and text analysis to match the Web form fields with their meanings. This does not need Site Mapping, but its accuracy is theoretically less then 100%. |
| Level-one authentication | Subscription network authentication with the regular account screen name and password, which is used to gain network access to the subscription system and services. |

TABLE 1-continued

Glossary of Terms

| | |
|---|---|
| Level-S authentication | Wallet authentication advancing beyond Level-one authentication by providing either a wallet password or answering a question/answer. |
| One-way hash | A one-way hash function, also known as a message digest, fingerprint, or compression function, is a mathematical function which takes a variable-length input string and converts it into a fixed-length binary sequence. Furthermore, a one-way hash function is designed in such a way that it is hard to reverse the process, that is, to find a string that hashes to a given value (hence the name one-way.) A good hash function also makes it hard to find two strings that would produce the same hash value |

Introduction

Figure 1:
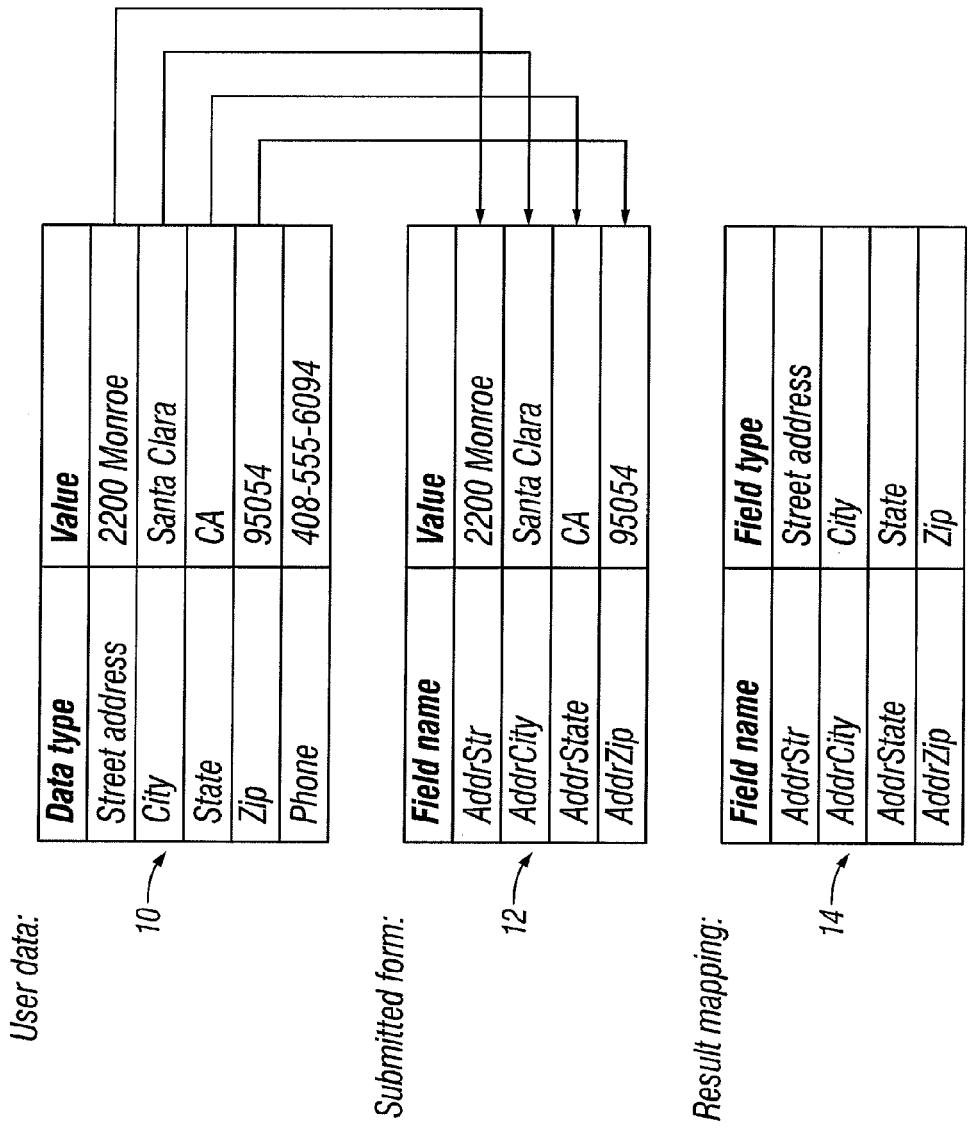
FIG. 1 is a tabular representation of a reverse mapping of user data contained in a submitted form to a result mapping according to the invention.

Subscription services, such as AOL of Dulles, Va., have large user bases. Every day thousands of subscription service users fill in forms, using their shipping and billing information, while they register or shop on-line. During this process they use their human intelligence, to read, understand, and complete such forms. One aspect of the invention borrows and reuses their intelligence to profile the pages they are visiting. Thus, in the presently preferred embodiment, every time a user submits a form (see FIG. 1) the client software tries to match the submitted information 12 with the stored profile of that user 10. If a match is discovered the program tags the field of the recognized data with a corresponding type. The resulting profile 14 can be used after that to help all subsequent users to fill the same form. This approach is referred to herein as reverse mapping (RM).

The herein disclosed method and apparatus for reverse mapping of forms by borrowing intelligence from a large subscription service user base is significant in at least the following ways:

It lowers the cost of maintaining high quality service across large number of constantly evolving Web sites.

It is self-correcting, so that only a limited number of users suffer degradation of their experience. As these users are exposed to potentially erroneous mappings their corrective measures are captured and reused subsequently to improve the service for the rest of the subscription service population.

It is self-organizing because the most frequently visited sites are mapped very fast and migrated from an unsupported category to a supported category.

It works automatically for international Web sites using the international users' profile information seamlessly.

It can be extended to arbitrary set of user specific profile attributes.

It has a network effect because it becomes more accurate and wide range as there are more users of the service.

Architecture

Figure 2:
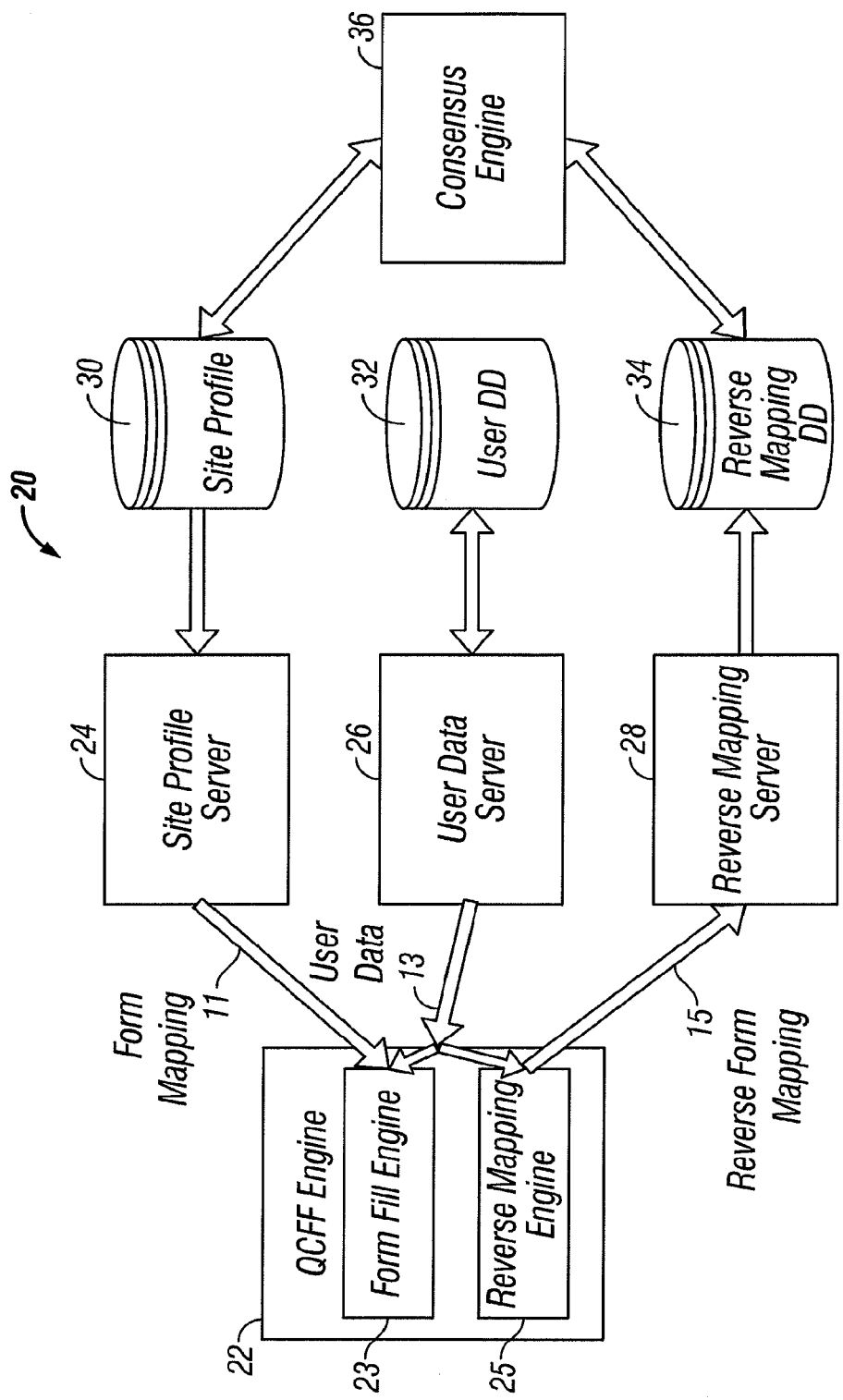
FIG. 2 is a block schematic diagram that shows a high level architecture of the presently preferred embodiment of the invention.

FIG. 2 is a block schematic diagram that shows a high level view of the architecture 20 of a presently preferred embodiment of the invention. In FIG. 2, the blocks Form Fill Engine 23 and Reverse Mapping engine 25 both constitute a quick completion form fill (QCFF) client engine 22, which is part of the browser in the preferred embodiment. Those skilled in the art will appreciate that such components of the invention can be situated elsewhere within the overall system architecture, as desired. The presently preferred Form Filling Engine is implemented using a combination of C++ and JavaScript libraries, but other techniques may be used, as are known to those skilled in the art.

The Form Fill Engine (FFE) 23 is responsible for two major tasks, i.e. analyzing the context of the users' navigation, and completing the forms upon users' consent or user initiated actions. To complete these tasks the engine pulls the user data and the rules to map this data to the requested form.

The FFE connects to the Site Profile Server (SPS) 24 to get information 11 about the mapping of the site currently visited by the user from the site profile database 30. It also connects to the User Data Server 26 to get user's profile 13 from the user database 32.

Figure 3:
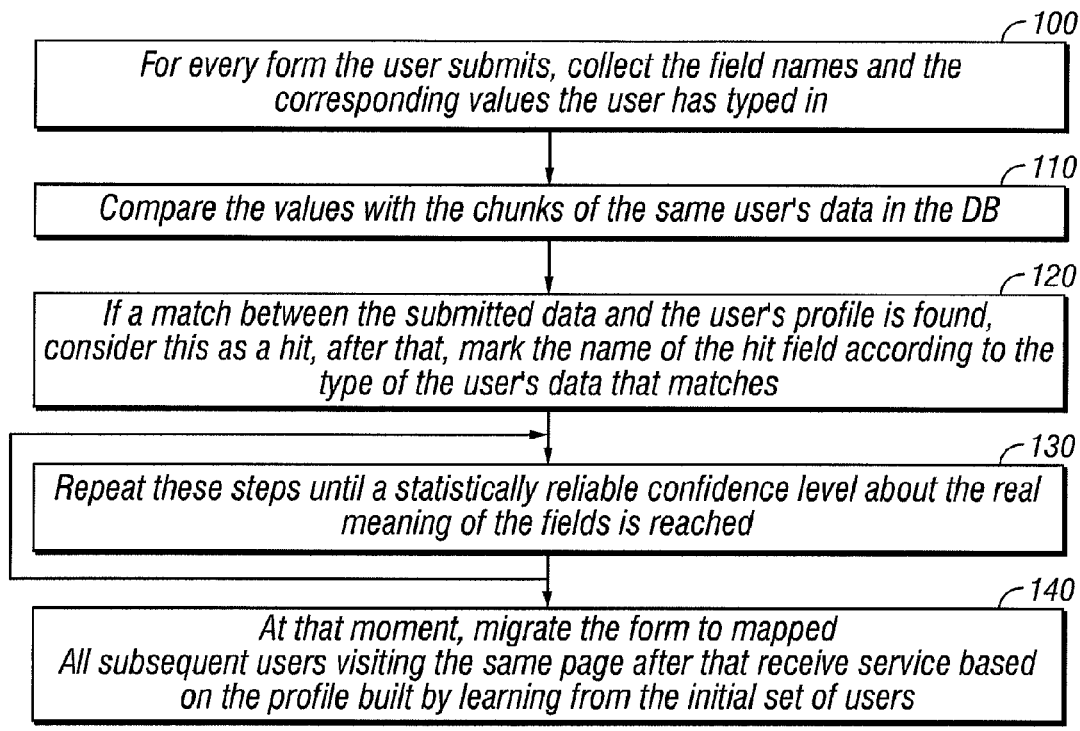
FIG. 3 is a flow diagram that shows an auto profiling algorithm according to the invention.
Figure 4:
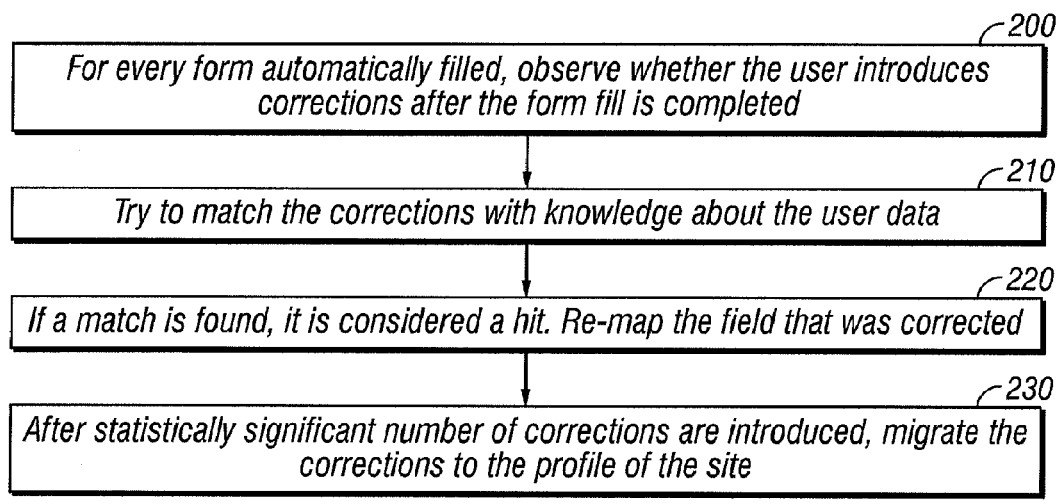
FIG. 4 is a flow diagram that shows an auto-correcting algorithm according to the invention.

The Reverse Mapping Engine (RME) 25 is responsible for implementing the two reverse mapping algorithms described below in connection with FIGS. 3 and 4.

After the engine recognizes a match, the extracted knowledge from this match 15 is communicated to the Reverse Mapping Server (RMS) 28 for permanent storage into the Reverse Mapping Database (RMDB) 34.

Finally, the Consensus Engine 36 is a process running in parallel and constantly monitoring the statistics of the reverse mappings, which are collected. After passing certain statistical level of consensus, the Consensus Engine can decide whether the mapping is accurate. This triggers migration of the mapping from the Reverse Mapping Database 34 to the Site Profile Database 30. The mapping could comprise various forms of information, such as a completely new profile, or an update of an existing profile. Following a successful migration/update, the engine preferably resets the statistics in the Reverse Mapping Database 34 for this form.

Exemplary Mathematical Foundation for Consensus Determination in Reverse Mapping Problem Description The problem can be formulated as follows:

A set of classes associated with Web form fields and user profile data is defined as $C=\{c_1, c_2, \ldots, c_n\}$. A field can belong to a single class only. In the context of reverse mapping the classes can be First Name, Last Name, Zip Code, Credit Card Number, etc. Let F be a given form defined with its fields as $F=\{f_1, f_2, \ldots, f_k\}$. Where $f_i$ corresponds to the name of the field. For practical reasons it is known that K, the number of fields in F is smaller then the number of available classes. This is a correct assumption as some of the classes are potentially redundant, when combined with others. For example, the class for the complete phone number (3+7) is redundant with the class of the area code (3) combined with the class of the local phone number (7). It is unlikely to encounter a Web form, which asks for the full phone number and separately for the area code and the local number. For the purposes of this discussion let N—the number of classes be 50 and K—the number of form fields be 8. It is also known that the classes of the fields are unique, so there is at most one class of each. Let D be a set of complete user data defined as $D=\{d_1, d_2, \ldots d_n\}$ There is one to one relation between the individual data members of D and the classes C, which means $class(d_i)=c_i$.

Define a reduction function $R=\{r_1, r_2, \ldots, r_n\}$ over the data of the user profile. The purpose of the reduction function is to hash the data and prevent attempts for identity or credit card theft. The hashing should lead to losing of more than 90% of the useful information in the profile, making the reconstruction of the original data practically impossible. The hashed or reduced user profile is then produced by applying the reduction function over the profile $H=R(D)=\{r(d_1), r(d_2), \ldots, r(d_n)\}$. A simple example of R is an MD5 hashing followed by a mod M operation. M could be class specific or more precisely class space specific. For example, for classes which occupy a relatively small space, e.g. month or year of the credit card expiration date, pick a small M to guarantee that enough information is lost during the reduction. Call M the level of discrimination. The higher the level of discrimination, the more information is preserved after the hash is applied. For the purposes of the discussion let M be 4.

In addition, there is a large pool of unique users. Each of the users has on average L number of D data profiles, where one of the profiles' reductions is known to the system. For the purposes of this discussion, let L be 3. In practice this means that the average consumer would use three different credit cards and would ship to three different addresses, but only one of the addresses and one of the credit cards would be known to the system. Every time a user from the pool submits the form F, capture the submitted data $V=\{v_1, v_2, \ldots, v_k\}$ and apply R over it as $G=R(V)$. Then compare the resulting reduced data E with the one known about this user and build match matrix $M=H \times V$ based on the following rule:

$$m_{ij}=0 \text{ if } v_i != h_j \text{ or}$$

$$m_{ij}=1 \text{ if } v_i = h_j. \tag{1}$$

Finally define the questions:
Is it possible to achieve arbitrary high accuracy in identifying the classes of the form fields based on the matching results received from the pool of users?
If it is necessary to ensure, e.g. 99.5% accuracy, how many samples is it necessary to collect?

Mathematical Background—Bayesian Theory of Sequential Hypothesis Testing

The following analysis relies on the Bayesian theory applied for hypothesis testing. The hypotheses herein that a given field $f_p$ from the form F is of class $c_q$. Evidence to prove the hypothesis is the resulting match matrixes after observing and collecting data from the pool of users. The classic form of Bayesian theorem is given as:

$$P(A \mid E, b) = P(A \mid b) \frac{P(E \mid A, b)}{P(E \mid b)} \tag{2}$$

where
A is the hypothesis under test;
b is context information representing knowledge about the system before any evidence collecting;
E is a new evidence, that might change knowledge about the system;
P is probability; and
| is used for notation to describe conditional probability.

With the above notations the Bayesian theorem can be interpreted as: How knowledge/belief about the system has changed after new evidence E is presented. P(A|b) is the old knowledge about the probability that A is true, before the evidence E to be presented. P(E|A,b) is the probability that E is true assuming the hypothesis A is true. And, finally, P(E|b) is a normalizing factor given as probability of E to occur independently from A. The less likely is E, the higher the weight of the evidence is, and vice versa.

Write equation (2) above with respect to finding how the evidence E changes a belief about the probability that A is false:

$$P(\overline{A} \mid E, b) = P(\overline{A} \mid b) \frac{P(E \mid \overline{A}, b)}{P(E \mid b)} \tag{3}$$

Now divide mutually (2) and (3):

$$\frac{P(A \mid E, b)}{P(\overline{A} \mid E, b)} = \frac{P(A \mid b) P(E \mid A, b)}{P(\overline{A} \mid b) P(E \mid \overline{A}, b)} \tag{4}$$

The left side of (4) is called the "odds" of hypothesis A to be true in case the evidence E is presented. Similarly, P(A|b) P(E|A,b) can be called the prior "odds" about A. Use notation O(A|E,b) for posterior and O(A|b) for prior odds about proposition A. Then rewrite (4) as:

$$O(A \mid E, b) = O(A \mid b) \frac{P(E \mid A, b)}{P(E \mid \overline{A}, b)} \tag{5}$$

In other words, the ratio $$\frac{P(E \mid A, b)}{P(E \mid \overline{A}, b)}$$

gives how presenting evidence E changes the odds of A. Note that $$\frac{P(E \mid A, b)}{P(E \mid \overline{A}, b)}$$

can be greater than one, in which case the evidence supports the proposition or less than one, in which case the evidence contradicts the proposition.

In the reverse mapping context, there is a sequence of evidence. The way this is organized guarantees that the evidence $E_1, E_2, \ldots, E_s$ are independent from each other. In this case, the cumulative effect of the series is given as:

$$O(A \mid E_S, b) = O(A \mid b) \prod_{i=0,S} \frac{P(E_i \mid A, b)}{P(E_i \mid \overline{A}, b)} \tag{6}$$

Now transform (6) to its logarithmic form as:

$$10 \log_{10} O(A \mid E_S, b) = 10 \log_{10} O(A \mid b) + 10 \sum_{i=0,S} \log_{10} \frac{P(E_i \mid A, b)}{P(E_i \mid \overline{A}, b)} \tag{6a}$$

Call the new logarithmic representation evidence. There are well-defined transformation rules from probability to odds to evidence as given in Table 1.

| Evidence e (db) | Odds O | Probability P |
| --- | --- | --- |
| 0 | 1:1 | 1/2 |
| 3 | 1:2 | 2/3 |
| 6 | 4:1 | 4/5 |
| 10 | 10:1 | 10/11 |
| 20 | 100:1 | 0.99 |
| 30 | 1000:1 | 0.999 |

Simple Case—Single Profile Usage

To simplify the initial analysis of the problem, lower the complexity by assuming that the users stick to use data only from the profile, which is known to the system. The task then is formulated as follows.

Problem 1:

The Web form F is defined with its eight fields $f_i$, where each one of them corresponds to a class $C_j$ from a set of 50 classes. There are no two fields from the same class. There is a large pool of users' profiles $D_1, D_2, \ldots, D_r$. Apply the hash over the set of D as explained above with level of discrimination M=4. Then ask the users to complete and submit the form using their profiles. During the process of submission the data are captured and hashed using the same function as with the profiles. For every user, construct the match matrix M as described in equation (1).

How many users are sufficient to achieve 99.5% accuracy of form fields' classification?

Solution:

The accuracy of 99.5% is for the whole form, which consists of 8 fields. To achieve total form accuracy of 99.5%, the accuracy per field should be $$\sqrt[8]{0.995},$$

which is 0.9994. This translates to roughly 32 db per field in the evidence scale. The initial knowledge of the system is that there are 50 classes. In the lack of any additional information, it is assumed that there is uniform probability of any of the classes. This sets the prior evidence $$e(A \mid b) = 10 \cdot \log_{10} \frac{1}{50-1} \text{ or}$$

−17 db. Each of the captured samples provides equal additive evidence which value can be expressed as:

$$10 \cdot \log_{10} \frac{P(E \mid Ab)}{P(E \mid \overline{A}b)} \quad (7)$$

The way the event E is defined in the case of reverse mapping is by the match between the user profile data hash and the submitted data hash. If the classes of the profile data and submitted data are the same, and assuming the user uses only single profile, then the probability of this is exactly one. In the denominator, the class of the submitted data and the class of the hypothesis testing data are different. Because the user data is hashed with information reduction, the space of possible M values is much smaller than the space of the original values. This means that hundreds of thousands of different names, addresses, credit card numbers, etc are represented with the same code. In case of M=4 these are 0, 1, 2, and 3. This gives a probability of $$\frac{1}{M}$$

false positive that the hashed first name of the user is classified as any one of the other 49 classes. Substituting the numbers in (7) gives a result that the contribution of each new sample is 6 db. To achieve the needed 32 db evidence, capture somewhat more than eight samples, which is the answer of the problem.

Multiple Profiles Usage

The numbers from the discussion above are contingent on the assumption that the users always select the profile data which is known the system. This is almost true when the data are related to the users' addresses because for the majority of on-line transactions these are the users' home addresses. However, in many cases an office address or some relatives' or friends' addresses are used. This is even more doubtful when the data are related to a credit card. The average U.S. adult consumer has in his pocket on average five credit cards. Taking this fact into account leads to the following questions: How the lack of knowledge about the profile in use changes the convergence rate calculated above?

This redefines the problem to a new one.

Problem 2

All the conditions from Problem 1 are still valid, but there is one additional factor that from the profiles $D_1$-$D_r$ only one out of five is known to the system.

Solution:

The new condition does not change the prior evidence calculated above as −17 db. What is the evidence in case the user submits a known profile. Again, this does not change the value calculated previously as 6 db of evidence contributed by each known profile. Estimate the evidence in case the profile is unknown. This time the value of the nominator $P(E|A,b)$ is the same as the value of the value of the denominator $P(E|\overline{A}b)=1/M$. The explanation of this is as in the case of no knowledge about the data that are submitted, where there is 1/M possibility the hash of this is the same as the hash of the data used in the comparison. This gives as evidence value 0 because there is no correlation between what the system knows and what is currently submitted. It is still necessary to accumulate about 50 db of evidence on top of the −17 db of prior evidence. However, this time the number of samples is much higher because only one out of five contributes to the total knowledge. The other 80% of the captured data creates white noise. There is 50 db difference needed between the winner class and the highest peak of the noise. For cases where the number of samples is higher than 30, assume normal distribution. The mean is given as $\mu=Np$, where p is the possibility for a hit and N is the number of data captures. Taking M=4 from above gives a possibility p=0.25. The standard deviation is $\sigma=\sqrt{Np(1-p)}$. For all practical purposes, consider that the white noise amplitude is in the range of $\mu \pm 3\sigma$. Taking into account the 50 db (eight units) deference needed between the winner class and any possible random peak leads to a value of $\mu+3\sigma+8$. Pick a sample size in which at least $3\sigma+8$ of the profiles are known to the system. For N=250, can calculate $\sigma=\sqrt{250 \cdot 0.25 \cdot 0.75}=6.8$. Based on that at least 28 known profiles are needed. Using similar approach, estimate that for all practical purposes for a size 250 the number of known profiles is $\mu \pm 3\sigma = 50 \pm 18.97$. The lower bound is bigger than 28, hence in this case size of 250 captures produces a correct reverse mapping.

Conclusions

Bayesian theory shows that by collecting multiple imprecise measurements, e.g. data captures in the case of reverse mapping, one can achieve arbitrary high degree of confidence about the meaning of the form fields. Two cases were analyzed in respect to the convergence number in order to reach very high confidence (more than 99%), e.g. simple where the users are limited to provide data from a single, known to the system profile, and complex where the users are free to use five profiles with only one of them known to the system. The simple case has been shown to reach 99.5% confidence in nine data captures. In contrast, the complex case needs on average 100 data captures to reach comparable level. Average Internet users are somewhere in the middle between one and five different credit cards usage in their on-line shopping. When it comes to the shipping addresses, the number of different options is much closer to one, rather than five. Regardless of the above more optimistic assumptions, collecting 250 reverse mapping captures is quite feasible and can be used as a triggering point. In addition to providing a high confidence level, this shows that the Web form is in high usage and deserves the resources for its migration to the mapped forms.

Reverse Mapping Algorithms

The following discussion describes the reverse auto-profiling algorithm (see, also, FIG. 3):

For every form the user submits, collect the field names and the corresponding values that the user has entered into the fields of the form (100).

Compare the values entered in to the form with the same user's data found in a central subscription service database (110).

If a match between the submitted data and the user's profile is found, consider this as a hit. After that, mark the name of the hit field according to the type of the user's data that it matches (120).

Repeat these steps until a statistically reliable confidence level about the real meaning of the fields is reached (130).

At that moment, migrate the form to a mapped status (140).

All subsequent users visiting the same page after that receive service based on the profile built by learning from the initial set of users (150).

The following discussion describes the reverse auto-correcting algorithm (see, also, FIG. 4):

For every form automatically filled, observe whether the user makes corrections after the form fill is completed (200).

Try to match the corrections with knowledge about the user data (210).

If a match is found, it is considered a hit. Re-map the field that was corrected (220).

After statistically significant number of corrections are introduced, migrate the corrections to the profile of the site (230).

Client Cache Algorithm

Note: The caching algorithm is not required to achieve the value of reverse mapping. It is an improvement with generic usage, and can be used by much broader set of applications. The cache described below improves the performance of the application, but it can be used independently from reverse mapping. In fact, the suggested cache can be implemented with known solutions and still have a beneficial effect on performance.

The caching algorithm involves coordination between the client and the Site Profile Server (SPS). The client maintains a cache of the form fill mapping data it receives from the SPS. In addition, the client maintains an index of all domains for which the SPS has form fill mapping data. The index is identified by a version number and contains a record for each domain supported. The client periodically polls the server to identify differences between the index version it has and the most recent index. The client uses this difference information to update its local index. When the difference information indicates that the mapping for a given domain has changed, the form fill mapping data for that domain stored in the cache is removed, if it was present.

While the client is used for browsing the Web, it checks to see if it has the mapping data for each domain it visits. If it navigates to a domain for which it has form fill mapping data, it operates under the assumption that the form fill mapping data that it has for this domain is the most current available, and it proceeds to use it to recognize checkout forms and offer to fill them. If the client navigates to a domain for which it does not have form fill mapping data, it requests the form fill mapping data for that domain from the SPS, stores it in its cache when it is received, and proceeds.

This algorithm maintains a relatively up-to-date version of mapping data for a given domain on those clients for which it is relevant, while minimizing the frequency of retrieval of form fill mapping data. If the SPS stores mapping information for a checkout form on, for example, YOUHAVENEVERBEENHERE.COM but a given client never visits that domain, the form fill mapping information is never downloaded for that domain by that client. More importantly, if the same client visits, for example, TOWERRECORDS.COM once per day, the client downloads the updated mapping information for this domain no more often than the mapping information changes for this domain or the polling period for cache index updates, whichever is less frequent.

Because form fill mapping data for a given domain changes relatively infrequently, and because most clients do not visit a vast number of domains, the largest cost for the SPS results from the cache index update requests. A reasonable polling period might be three days, although the actual polling period is a matter of choice for those skilled in the art.

Security and Privacy

The reverse mapping technique herein disclosed works well if it is applied to the majority of a subscription service user base. This means that a reverse mapping activity runs as a background process on every machine trying to match the user data stored in the subscription service system with data that the user submits while browsing. This raises questions about violations of privacy and security standards.

Security

The danger here comes from the need to download the user's profile without challenging the user with a higher level of authentication. This may give access to private and sensitive information just by knowing user's screen name and level-one password. Most subscription service users are not very careful with their credentials. However, in keeping with the invention herein several measures can be taken to alleviate this concern. In one embodiment, the profile is hashed before sending it to the client. The same hash is performed with the data that the user submits. In this way, equal strings before hashing are equal after hashing, as well.

Unfortunately, this method does not provide adequate security for all purposes because, in some cases, the space set of the possible user data is limited. For example, a hacker can try several thousands of zip codes and compare the produced string after hashing until finds out the real zip code that generates the same hash. However, it is possible to combine the technique disclosed herein with some additional restrictions to prevent this from happening.

One embodiment encrypts the user data with a user specific symmetric key, stored in the User Database. Then, the encrypted profile is stored on the user's machine after the first time the user authenticates with a level-s password from this machine. This is preferably not allowed if the user is logged in as a guest. This eliminates the chance that the user's profile may be left on some publicly available PC, e.g. in a library or Internet cafe.

Another embodiment is useful if it is decided not to use all of the information available in the user's profile. For example, the system may transform every single value form the user's profile to a couple of bits, losing in this way most of the information. One possible way to do this is to use a hashing method for the individual fields of the user's profile and then use only the last 2-3 bits of the hashed value. This profile reduction generates a lot of false positives. However, a good hash algorithm is known to produce uniform distribution of the hashed values, which in turn leads all false positives to negate each other. In contrast, the true positives will consolidate around the same type of the field. This reveals only few bits of the information to hackers and still provides enough confidence from a statistical point of view to generate the reverse mapping.

Privacy

A major concern with use of the invention concerns privacy violations that could occur by monitoring the users and collecting information about their actions and habits without the users consent thereto. The preferred embodiment of the herein disclosed invention does not need to know exactly who was performing certain form fills, but rather how, on average, a number of users understand the meaning of a given form. In this regard, the invention does not need to store any user identifiable information per se. On the other hand, there is a requirement to make decisions based on the consensus built from a number of different users completing a given form. Also, it is desirable to prevent any chances that a single person can create a wrong, potentially malicious mapping by submitting incorrect data multiple times.

These seem to be conflicting concerns. One way to resolve this conflict is provided by the following approach. At the first time the user authenticates with his level-s password, the server generates a large, random number token, signs it with a certificate, and stores it persistently at the user's machine. The digital signature is used to validate the legitimacy of the ID. The user is then flagged to prevent the issuing of multiple ID's for the same user. The randomness of the ID guarantees that real user identities are not traceable. In this way, the RMS can identify communications for unique users without knowing the actual identity of the users themselves.

This ID and signature are then included in all communications between the user and the Reverse Mapping Server (RMS). The number should be large enough to identify the user uniquely. The use of a signed certificate prevents tampering.

The signed token is stored at the user's machine along with the profile. This becomes the identification mechanism needed to ensure the consensus requirement. Because the original number and the signed number are not stored in the server at the moment of their generation there is no practical way to trace back the real user name behind this profile.

It is still theoretically possible that the same user can install multiple browsers and perform multiple wrong mappings. To prevent this, the number of times a given user is assigned a new token ID can be limited. This number is optionally reset periodically so that users who normally change their machines or upgrade are not dropped from the network of contributors.

Note: Similarly to the cache, the identity decoupling approach described above is an improvement or enhancement to the reverse mapping invention. It is a part of a preferred reverse mapping, but not from a technology point of view. Its main value is to elevate privacy/security concerns. It is part of the preferred embodiment, but can be applied in a much broader scope in similar cases where the exact identity of the user is not needed, but rather it is necessary that guarantee the different or unique users get access to certain privileges. It is the election voting paradigm where there is a right to vote, but nobody can trace what the vote is.

Protection of Wallet Data

For reverse mapping to be available as part of the client, the opportunity must be available to the client to compare data entered in HTML forms with the data in the user's wallet. Because it is a rare occurrence when the user is level-s authenticated, the wallet information must be available for comparison when the user is only level one authenticated. This presents some security concerns because the user's wallet information is highly sensitive information. Great care must be taken to ensure that the information is not compromised. This is accomplished in the preferred embodiment by using the following precautions:

The user's profile is stored persistently on the client after the first level-one authentication.

The user's profile is partial. For example, every value in the profile is hashed using MD5 and after that only the last three bits are send to the client. This way, even if the information becomes available to hackers it does not provide them with any substantial benefit. This creates significant number of false positives with the reverse mapping algorithm. This effect can be filtered out by requiring a minimum number of users, 100 for example, to produce the same mapping. Even if this generates a lot of false positives, they tend to be uniformly distributed. Only one of the mappings stand up higher than the others, and this is the one around which the users consolidate.

False Mapping Vulnerability

Because the RM process relies on the user's activity to deduce the form fields' types there is a possibility for someone to create incorrect mappings to gain unfair benefit. For example, a malicious user can profile his own site, where there is a form for visitors to register. The visible part of the form would ask for some harmless user data, such as zip code or state, but the hidden part would require credit card and billing address information. There are a number of ways to accomplish this, for instance the hidden fields could be off-screen in a location the user would not expect to look, or they could be concealed using the CSS visibility or z-order styles. The user might allow form-fill to fill the form with their sensitive information and submit it, without realizing that this was happening.

This risk can be alleviated if the server side of the RM waits until a considerable number of unique users generate the same mapping for the form. Only after a certain threshold number is reached would the server enable the new mapping for all users. In this way, a hacker alone would not be able to pass the threshold, but would need a large number of accomplices to help him.

Additional protection could be provided if every form-fill completion is accompanied with a message informing the user what information is about to be filled. Requiring the user's consent before the actual form-fill happens, including options for the user to check/uncheck which data are to be filled, could further strengthen this method.

Exact Match of Wallet Items Vs. Inexact Match

This embodiment of the invention comprises an algorithm for storing only the obscured wallet data items and not the actual wallet items themselves. This algorithm can recognize wallet data items because, when the same transformation is applied to the values entered in HTML forms by a user, the result is always the same for the same input value. Thus, if a user's wallet contains the first name "George," then every time the user types the name "George" into an HTML form, the field containing this exact value is correctly identified as being the first name type.

Take, for example, the case when the user types his first name as "GEORGE." This is not an exact match, and thus is not correctly identified as a first name field. An even more complicated example is that of the phone number field. If the phone number is stored in the wallet as "555-1212" but the user enters "5551212," again the data do not match exactly, and the comparison fails. One solution to this problem is to normalize the data in both cases before performing the transformation. The wallet data and the data entered in the form could be first converted to upper case and then spaces and punctuation could be removed before the transformation is applied. The result is then the same, and the comparison succeeds despite differing formats. The format used could be communicated to the RMS along with the field type so that it can later be used by the Form Fill Engine (FFE) to fill the form by formatting the data in the way the form expects.

Multiple Selection Input Items

Even when using some kind of normalization process, it may still not be possible always to make an accurate comparison. Multiple selection form items are good examples of this. For instance, if the wallet stores the credit card type as "Visa" but the credit card type in a form is to be entered in a drop down list having the options "Visa Account," "MasterCard Account," and "Amex Account," no reasonable normalization process could provide an exact match for the wallet item and the form item.

The best coverage for this situation is provided when combining the IFF and RM solutions. IFF can be used to make guesses about the presence of checkout forms and the field meanings when the mapping for a form is unavailable from the SPS. The information about field type from IFF can then be included in the reverse mapping information sent to the RMS. As an additional benefit of this approach, the user does not have to wait until other users have reverse mapped a given form before form-fill is available.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method, comprising:
   detecting, by a first application, that a second application has loaded a form, wherein the form comprises one or more fields;
   accessing, by the first application, user data for a first user stored by the first application, the user data comprising one or more data values;
   based on tracked information indicating values entered by a set of one or more other users into the one or more fields of the form, identifying, by at least one processor, a correspondence between the one or more fields of the form loaded by the second application and the one or more data values of the user data for the first user stored by the first application, wherein the set of one or more other users does not include the first user; and
   completing the identified one or more fields of the form loaded by the second application with the corresponding one or more data values of the user data for the first user stored by the first application and identified based on the tracked information indicating values entered by the one or more other users into the one or more fields of the form.

2. The method as recited in claim 1, further comprising:
   prompting the first user to provide the one or more data values; and
   receiving, at the first application, the one of more data values from the first user.

3. The method as recited in claim 2, further comprising:
   detecting, by the first application, that the first user has modified the one or more data values used to complete the identified one or more fields of the form loaded by the second application; and
   modifying the one or more data values of the user data stored by the first application in accordance with the one or more data values modified by the first user.

4. The method as recited in claim 1, further comprising:
   detecting, by the first application, that the first user has submitted the form loaded by the second application; and
   modifying the user data for the first user stored by the first application based on one or more values entered by the first user into the one or more fields of the form loaded by the second application.

5. The method as recited in claim 1, further comprising referencing form fill mapping data as part of the identification of the one or more fields of the form loaded by the second application that correspond to the one or more data values of the user data for the first user stored by the first application.

6. The method as recited in claim 5, further comprising receiving the form fill mapping data from a site profile server.

7. The method as recited in claim 6, further comprising caching the form fill mapping data received from the site profile server.

8. The method as recited in claim 1, further comprising analyzing, by the first application, the first user's navigation of the second application.

9. The method as recited in claim 8, wherein the first application comprises a form fill engine.

10. The method as recited in claim 1, wherein the second application comprises a browser.

11. The method as recited in claim 1, wherein the one or more data values of the user data stored by the first application comprises user profile data.

12. The method as recited in claim 1, wherein the one or more data values of the user data stored by the first application comprises text.

13. A system comprising:
    at least one processor; and
    at least one non-transitory computer readable storage medium storing instructions thereon that, when executed by the at least one processor, cause the system to:
    detect, by a first application, that a second application has loaded a form, wherein the form comprises one or more fields;
    access, by the first application, user data for a first user, the user data comprising one or more data values;
    based on tracked information indicating values entered by a set of one or more other users into the one or more fields of the form, identify a correspondence between the one or more fields of the form loaded by the second application and the one or more data values of user data for the first user stored by the first application, wherein the set of one or more other users does not include the first user; and
    complete the identified one or more fields of the form loaded by the second application with the corresponding one or more data values of the user data for the first user stored by the first application and identified based on the tracked information indicating values entered by the one or more other users into the one or more fields of the form.

14. The system as recited in claim 13, further comprising instructions that, when executed by the at least one processor, cause the system to:
  prompt the first user to provide the one or more data values; and
  receive, at the first application, the one of more data values from the first user.

15. The system as recited in claim 13, further comprising instructions that, when executed by the at least one processor, cause the system to:
  detect, by the first application, that the first user has modified the one or more data values used to complete the identified one or more fields of the form loaded by the second application; and
  modify, by the first application, the one or more data values of the user data stored by the first application in accordance with the one or more data values modified by the first user.

16. The system as recited in claim 13, further comprising instructions that, when executed by the at least one processor, cause the system to:
  detect, by the first application, that the first user has submitted the form loaded by the second application; and
  modify, by the first application, the user data for the first user stored by the first application based on one or more values entered by the first user into the one or more fields of the form loaded by the second application.

17. A non-transitory computer readable storage medium storing instructions thereon that, when executed by a processor, cause a computer system to:
  detect, by a first application, that a second application has loaded a form, wherein the form comprises one or more fields;
  access, by the first application, user data for a first user, the user data comprising one or more data values;
  based on tracked information indicating values entered by a set of one or more other users into the one or more fields of the form, identify a correspondence between the one or more fields of the form loaded by the second application and the one or more data values of the user data for the first user stored by the first application, wherein the set of one or more other users does not include the first user; and
  complete the identified one or more fields of the form loaded by the second application with the corresponding one or more data values of the user data for the first user stored by the first application and identified based on the tracked information indicating values entered by the one or more other users into the one or more fields of the form.

18. The computer readable storage medium as recited in claim 17, further comprising instructions that, when executed by the processor, cause the computer system to:
  prompt the first user to provide the one or more data values; and
  receive, at the first application, the one of more data values from the first user.

19. The computer readable storage medium as recited in claim 17, further comprising instructions that, when executed by the processor, cause the computer system to analyze, by the first application, the first user's navigation of the second application.

20. The computer readable storage medium as recited in claim 19, further comprising instructions that, when executed by the processor, cause the computer system to reference form fill mapping data as part of the identification of the one or more fields of the form loaded by the second application that correspond to the one or more data values of the user data for the first user stored by the first application.

\* \* \* \* \*